(12) United States Patent
Lord (10) Patent No.: US 7,150,353 B2
(45) Date of Patent: Dec. 19, 2006

(54) METHOD FOR SAFE HANDLING OF UNSTABLE HYDRIDE GASES

(76) Inventor: Stephen Michael Lord, 109 Peppertree La., Encinitas, CA (US) 92024

( * ) Notice: Subject to any disclaimer, the term of this patent is extended or adjusted under 35 U.S.C. 154(b) by 443 days.

(21) Appl. No.: 10/633,462

(22) Filed: Aug. 1, 2003

(65) Prior Publication Data

US 2005/0023365 A1    Feb. 3, 2005

(51) Int. Cl.
*B65D 85/00* (2006.01)

(52) U.S. Cl. .......... 206/0.6; 220/900

(58) Field of Classification Search ........ 206/0.6; 220/560.01, 581, 592.01, 500, 501, 900; 222/3

See application file for complete search history.

(56) References Cited

U.S. PATENT DOCUMENTS

| | | | | |
|---|---|---|---|---|
| 3,822,807 A | * | 7/1974 | MacDonald et al. | 220/88.1 |
| 4,013,190 A | * | 3/1977 | Wiggins et al. | 220/501 |
| 4,925,053 A | * | 5/1990 | Fenton et al. | 220/88.1 |
| 5,069,291 A | | 12/1991 | O'Connell | |
| 5,197,595 A | * | 3/1993 | Coultas | 206/0.6 |
| 5,512,088 A | * | 4/1996 | McKenzie | 96/152 |
| 5,518,528 A | | 5/1996 | Tom | |
| 5,816,332 A | * | 10/1998 | Alhamad | 169/45 |
| 6,015,065 A | * | 1/2000 | McAlister | 220/586 |

OTHER PUBLICATIONS

Zabetakis, Michael George, Flammability Characteristics of Combustible Gases and Vapors, 1965, U.S. Dept. of the Interior, Bureau of Mines, Washington.*

* cited by examiner

*Primary Examiner*—Frank M. Lawrence

(57) ABSTRACT

A method for safely handling unstable hydrides, such as germane, in an enclosure which has one or more openings, by partitioning the enclosure into smaller but interconnected volumes and providing heat storage and transfer within the enclosure to rapidly remove heat from any incipient hot spot before it can reach a temperature where it could rapidly propagate to the rest of the enclosure. A preferred embodiment includes where the partitioning material comprises part or all of the means to store the heat and has a large surface area to rapidly adsorb heat from the gases in the smaller volume. An even more preferred embodiment is where the partitioning material comprises materials that can be poured into the enclosure. The use of sensible heat, phase change or chemical reactions are feasible ways to store the heat.

12 Claims, 7 Drawing Sheets

Fig 1b: Weight ratio of Diluents

Fig 1d : Effect of Pressure on Volume % of Enclosure Needed for Silica Diluent when Handling Acetylene with the Method of the New Invention Fig 2 b Horizontal pipe Fig 2 a Gas Cylinder Fig 3 b Safe Distillation Column Fig 3a Standard Packed Distillation

Fig 4a. Cut Tube

Fig 4c. Compact Packing

Fig 4b. Loose Packing

METHOD FOR SAFE HANDLING OF UNSTABLE HYDRIDE GASES

BACKGROUND OF THE INVENTION

This invention relates generally to the field of safe handling of chemicals, and more particularly to a method and apparatus for preventing fire and explosions in the production, purification and transportation of unstable hydrides by subdividing the enclosure containing the hydride and providing localized heat storage and heat transfer means to remove heat from an incipient fire or explosion so as to prevent propagation of the aforesaid fire or explosion.

The invention relates to a method for preventing the occurrence of a fire or explosion in an enclosure. The term "enclosure" as used herein describes a space having a boundary that substantially encloses the perimeter of the space such as a storage tank, a cylinder, a duct, a cavity, or a vessel, which may be at any pressure. The enclosure has one or more openings to permit the ingress and egress of materials and said openings may be sealed by devices such as flanges or valves and may be connected in series with other enclosures.

The problem of fire and explosions in enclosed spaces has been a serious issue for many years. It was recognized that these explosions required a source of ignition and also a sufficient amount of the flammable gas and air. Thus the "Lower Explosive Limit" of a particular gas is defined as the minimum amount of the gas mixed with air at room temperature and pressure, which would explode in the presence of a source of ignition and is referred to as "LEL". The "Upper Explosive Limit" of a particular gas is defined as the maximum amount of the gas mixed with air at room temperature and pressure, which would explode in the presence of a source of ignition and is referred to as "UEL". Thus it was recognized that it was possible to have a safe mixture of potentially explosive gas with air providing the concentration of the gas was either below the LEL or above the UEL. The LEL and UEL provide useful concepts for room temperature and pressure situations in air and can be modified to account for temperature pressure and the presence of other gases. The addition of a gas to another gas is termed "diluting" and the added gas is the "diluent". Zabetakis provides in Bureau of Mines Bulletin 627 flammability, data for more than 200 combustible gases and vapors and graphs and empirical rules that can be used for adjusting the LEL and UEL for gases under different conditions from the standard room temperature and dilution with air. It is thus possible to adjust the flammability range. The bulletin also notes that for gases such as hydrazine, which can burn in the absence of an oxidizer, the UEL is 100% but it is possible to add stable diluents that will render the mixture nonflammable. The effect of tube diameter on the decomposition of pure acetylene is shown in FIG. 61 of the Bulletin and shows the inverse log—log relationship of pressure and diameter.

It was also recognized that fire and explosions were related phenomenon with explosions being extremely rapid fires. Thus since it was well known that water and other chemicals would put out fires, the idea of suppressing explosions with water or other chemicals has been studied and can be effective providing the explosion is detected and suppressed before it builds up to destructive power.

There are two types of technology for safe handling of potentially hazardous gases in enclosures, the prevention approach and the suppression approach. In the prevention approach the technology attempts to prevent a fire or explosion from starting by removing the source of ignition or by operating in a non-flammable regime. Removing the source of ignition may mean use of intrinsically safe, low voltage, sensors, protecting against static discharge and external insulation to protect against fire and operating below the auto ignition temperature, the temperature at which a material explodes without a source of ignition. The main advantage of the removal of a source of ignition is that it is relatively low cost; its major disadvantage is that there may be an unexpected source of ignition in which case there is no protection. The unexpected sources of ignition can be a catalytic reaction with the wall of the enclosure or with corrosion products on the wall, such reactions typically form hot spots that slowly t accumulate heat until a fire or explosion can propagate.

One common example of operating in a non-flammable regime is the use of nitrogen "blankets" over flammable liquids stored in atmospheric pressure tanks to prevent fires. This is an example of dilution with nitrogen of a flammable vapor and air mixture. Sufficient nitrogen is provided to raise the LEL of the mixture so that the mixture is not flammable at the operating conditions of the tank. For sealed gas cylinders, certain gases that decompose without an oxidizer, i.e. an upper UEL of 100%, are shipped in a diluted form such that they are non-flammable. Alternatively they may be shipped or used at reduced pressure since reducing the pressure has been shown to reduce the risk of deflagration, as shown in FIG. 61 of Zabetakis for Acetylene. They may also only be shipped in small cylinders since lowering the diameter lowers the risk.

The advantage of operating in the nonflammable regime is that it is a passive system and will prevent fires and explosions within the conditions it is designed for. However the lack of purity is particularly a problem during production and purification of the flammable materials, particularly materials, which are flammable without an oxidizer. The standard purification techniques of distillation and membrane separation can be carried out in the substantial absence of air fairly readily for materials that are stable in the absence of an oxidant because it is possible to operate above the UEL. However for materials, which have a UEL of 100% because they can decompose in the absence of an oxidant, there is no safe region for distillation of the pure material. Use of a diluent gas increases the capital and operating cost of the purification material because it must be bigger and process more material as well as recycle the diluent. Another variation has been to absorb the gas on a solid sorbent as in U.S. Pat. No. 5,518,528. This reduces the pressure in the headspace of the enclosure and stores the majority of the gas as an adsorbed species, which is attached to the sorbent by physical or chemical forces. To desorb the gas from the apparatus it is necessary to reduce pressure, add heat or a combination of the two. As noted in the above patent the sorbent can promote decomposition of the stored gas and special precautions are required to avoid this problem. Adsorption-desorption systems are more complicated for the end user in comparison to a gas cylinder thus they tend to be considerably more expensive to buy and operate. This technique is also not applicable to such standard separation techniques as distillation or membrane separation.

The suppression type of technology relies on the detection of incipient fire or explosion and then rapidly suppressing the event.

U.S. Pat. No. 5,069,291 describes a system of detecting the incipient pressure rise of an explosion and suppressing that explosion by spraying hot pressurized water into the enclosure. The patent claims that the explosion must be detected and suppressed within 10–200 milliseconds and discusses competing technology using chemicals such as Halon 1011 (chlorobromoethane) and MAP (monoammonium phosphate). The use of Halon is being restricted because of concerns about ozone depletion and the use of any suppressant will contaminate the enclosure.

Suppression type systems rely on rapid detection and on the careful design of the flow of the suppressant to the site of the fire or incipient explosion. Suppression of explosions must be much faster than fires and so the detection and activation of the suppressant discharge is advantageously combined as in U.S. Pat. No. 5,069,291. The prior art for direct suppression of fire or explosions is an active system that requires fast detection and response to inject a quenching chemical into the enclosure that may fail or be too slow to prevent the explosion. It is well known to engineers that systems that are not in regular use may not work when needed because of lack of maintenance or an undetected fault. Thus it is normally required to have some routine testing to ensure the equipment still works, which adds cost and may require decontamination of the enclosure after testing. After each suppression of fire or explosion the enclosure is also contaminated with the suppressant materials and some initial products of the reaction. With the increased emphasis on safety the avoidance of flammability approach has become the most common solution because it is essentially a passive system and will prevent fires and explosions within the conditions it is designed for although if the temperature and or the pressure rise above design conditions the gas may become flammable. The major problems are that the diluent gas must be provided and in the case of transportable containers must be also shipped which adds additional cost for the larger container. The larger container also occupies more space during production, distribution and use. Use of lower pressure containers also increases the size of the container and restricting the size of the container increases the cost because it is not possible to obtain economies of scale. A further problem is that the mixture of gases is by definition no longer pure, which is only a minor problem for flammable liquids, since the vapor and diluent mix can be discarded but is a big problem for flammable gases The lack of purity is particularly a problem during production and purification of materials which have a 100% UEL because there is no safe region for distillation of the pure material in contrast to the ease with which standard purification techniques of distillation and membrane separation can be carried out safely for materials which have a UEL less than 100% simply by operating above the UEL. The option of using a diluent increases the capital and operating cost of the purification material because the separation equipment must be bigger and process more material. Using lower pressure and temperature decreases the risks but also increases the costs as the equipment must be larger and refrigeration equipment increases in cost as the temperature decreases.

Many of the gases with 100% UEL are unstable hydride gases such as hydrazine, acetylene, silane and germane. A hydride gas is a gas containing hydrogen. Unstable gaseous hydrides are gaseous compounds containing hydrogen that have a positive heat of formation. Examples of such gases are found in the compounds of hydrogen with elements from the 4th, $5^{th}$ and $6^{th}$ column of the periodic table. The term heat of formation refers to the heat required to form a given compound from the elements of which it is comprised. A negative heat of formation means that heat is given out when the two elements are combined, as an example the formation of water from hydrogen and oxygen provides a large release of heat and conversely the production of the elements from the compound requires the addition of energy. A positive heat of formation means that heat must be added to form the compound from its elements, as an example Silane, $SiH_4$, requires the addition of heat for its formation and generates heat when it decomposes to form the elements. Such gases are very useful in the semiconductor industry for the deposition of pure metals, particularly semiconductors such as silicon and germanium, since they can be produced in a highly purified form by techniques such as distillation. A major disadvantage of such gases is that the decomposition can occur during production of the gases particularly when the gases are condensed under pressure to form liquids suitable for distillation. The decomposition causes a rise in temperature and pressure from the heat release and the production of hydrogen gas. The temperature rise can weaken the construction materials of the container of the gas, which in combination with the rapid pressure rise can result in rupture of the container. The temperature and pressure rise are proportional to the heat of formation. One method for assessing the risk of such decompositions is to calculate the adiabatic temperature and pressure that would occur during decomposition in the absence of any heat loss from the gas and design the container so that these condition can be withstood., See Arno. This latter assumption is fairly valid for the extremely rapid explosive reactions, which are the main concern since heat exchange is much slower than the reaction. These calculations use the known heat of formation to calculate the adiabatic heat release, and then use the known heat capacities of the reaction products produced to calculate the peak temperature produced when all the released heat is used to heat the produced elements. This temperature can be used to calculate the pressure rise due to temperature increase. There is also an increase in the number of gas moles, which contributes further to the pressure rise. The multiplication of these two effects gives the total pressure ratio, which is defined as the final pressure over the initial pressure. The table below gives the calculations based on a starting temperature of 25° C. for typical hydrides.

EXAMPLE 1

Acetylene

There are two decomposition routes since methane is more stable than its elements:

$C_2H_2 \rightarrow 1.5C+5CH_4$ Generates more heat. Peak Temp=3278.1° C.

$C_2H_2 \rightarrow 2C+H_2$ Generates more gas. Peak Temp=2902.8° C.

EXAMPLE 2

Germane

Germane has only one decomposition route $GeH_4 \rightarrow Ge+2H_2$ Peak Temperature=937° C.

TABLE 1

Peak temperature & pressure for selected hydride gas decomposition

| Name | Formula | Heat of Formation kcal/mole | Moles gas/mole | Temp. C. | Press. ratio |
|---|---|---|---|---|---|
| Acetylene | $C_2H_2$ | 54.2 | .5–1 | 2902–3278 | 6–10.5* |
| Propadiene | $C_3H_4$ | 45.9 | 1–2 | 1584–2159 | 8.2–12.5 |
| Methylacetylene | $C_3H_4$ | 38.97 | 1–2 | 1376–1975 | 7.5–11 |
| 1-3,butadiene | $C_4H_6$ | 26.1 | 1.5–3 | 803–1374 | 8.29–10.8 |
| Ethylene | $C_2H_4$ | 12.5 | 1–2 | 606–1427 | 5.7–5.9 |
| Propylene | $C_3H_6$ | 4.9 | 1.5–3.0 | 195–1091 | 4.7–6.86 |
| Hydrazine | $N2H4$ | 22.75 | 3 | 1066 | 13.5 |
| Silane | $SiH_4$ | 8.2 | 2 | 448 | 4.8 |
| Disilane | $Si_2H_6$ | 19.192 | 3 | 616 | 5.97 |
| Germane | $GeH_4$ | 21.7 | 2 | 937 | 8.12 |
| Digermane | $Ge_2H_6$ | 38.8 | 3 | 937 | 12.18 |
| Stannane | $SnH_4$ | 38.9 | 2 | 1741 | 13.5 |
| Arsine | $AsH_3$ | 14.63 | 1.5 | 817 | 5.5 |
| Stibine | $SbH_3$ | 34.68 | 1.5 | 1660 | 9.72 |
| Bismuthine | $BiH_3$ | 43.0 | 1.5 | 2259 | 12.75 |
| Hydrogen Selenide | $H_2Se$ | 7.17 | 1 | 425 | 4.68 |
| Hydrogen Telluride | $H_2Te$ | 23.8 | 1 | 1352 | 5.45 |

*The experimental measurement for deflagration in acetylene vapor is 11 times the initial pressure, which agrees with these calculations.

Another approach is to dilute the hydride with hydrogen and the appropriate conditions for this can be determined experimentally, see Arno, or by a similar calculation to that used in the prior examples except by adding a diluent which must also be heated and thus reduces the peak temperature. The problem then becomes what is a "safe" peak temperature. One approach has been to match the peak conditions of 100% silane as traditionally silane has been purified and stored with standard techniques. Thus "safe" can be the concentration of the pure material in hydrogen which would have a similar peak temperature and pressure rise to that of silane.

EXAMPLE 1

Disilane at 40% by Volume in Hydrogen $0.4Si_2H_6 + 0.6H_2 \rightarrow 0.8Si + 1.8H_2$ Peak Temperature is 478° C.

TABLE 2

Examples of Dilution requirements to match 100% silane

| Name | Formula | Max % | gas moles ratio (out/in) | Temp. C. | Pressure ratio |
|---|---|---|---|---|---|
| Disilane | $Si_2H_6$ | 40 | 1.8 | 478 | 4.5 |
| Germane | $GeH_4$ | 20 | 1.2 | 481 | 3 |
| Digermane | $Ge_2H_6$ | 10 | 1.33 | 434 | 3.15 |
| Stannane | $SnH_4$ | 10 | 1.33 | 473 | 3.33 |
| Arsine | $AsH_3$ | 30 | 1.15 | 470 | 2.5 |

Thus the additional heat required to heat the hydrogen diluent reduces the peak temperature and the pressure ratio to that similar to silane. Note that Arno quotes an upper concentration of 20% for germane which corresponds well to this "silane matching criteria as can be seen from the table above. Applying these same safety considerations to the design of the separation systems will increase the cost compared to standard practice. However the assumptions of comparability to silane are not as valid as believed because silane has a higher temperature of decomposition, 340° C. than other hydrides such as germane, 278° C. or acetylene, 280° C. Silane preferably reacts in the gas or homogeneous phase while germane and acetylene more easily react on the surface. Surface dependent decomposition is affected by the surface and different surfaces can initiate decomposition at lower temperatures. For example Tamaru discusses the increase in reaction rate caused by the presence of trace amounts of oxygen on the germanium surface. The lack of understanding of the underlying mechanisms and the disadvantages of using a gas as a diluent lead to a desire to minimize the use of diluent and to use experimental testing as the main way of establishing safety as discussed by Arno. Such tests are expensive and are carried out with carefully prepared and frequently small containers, see Arno, which tends to mean that too few tests are carried out to pick up surface catalysis problems resulting from a low probability inadvertent contamination event and that the inherent additional safety caused by the diluent effect of the small diameter container is ignored. Thus on scale up to production sizes, quantities and conditions the safety is significantly reduced. Since the matching of silane conditions is not as safe as perceived by current practitioners it is desirable to design the system for a given hydride based on the decomposition properties of that hydride as in the present invention.

BRIEF SUMMARY OF THE INVENTION

A primary object of the invention is to safely handle unstable hydride gases

Another object of the invention is to passively suppress incipient fires and explosions in such gases Another object of the invention is to allow safe transport of unstable hydride gases.

A further object of the invention is to permit safe separation of unstable hydride gases.

Yet another object of the invention is to permit safe production of pure unstable hydride gases.

Still yet another object of the invention is to permit safe distillation of unstable hydride gases.

Another object is to require no changes to the standard operating procedure for the storage or processing enclosure/s.

In accordance with a preferred embodiment of the present invention, a method for safe handling of unstable hydride gases comprises an enclosure with one or more openings, a partitioning means to divide the said enclosure into smaller volumes, one or more connecting passageways between each smaller volume and an opening to the enclosure, a means to store heat within the said enclosure, a heat transfer means from every smaller volume to the means to store heat, and sizing the partitions, the heat sinks and the heat transfer means so as to prevent the temperature of the gas or gases in any of the smaller spaces from reaching the minimum temperature needed to cause ignition or decomposition of the gas or gases in an adjoining space. The method can be readily applied to the production, purification and shipping of highly pure unstable hydrides by use of a reusable solid diluent to subdivide the tanks, pipes, distillation columns and cylinders into smaller enclosures and provide heat storage to prevent propagation of fires and explosions. The solid diluent can easily be fabricated from hollow tubes, wire mesh or waste materials such as turnings, and can be reused. The solid diluent material can be any solid except materials known to significantly adsorb, react with or cause the catalytic decomposition of the hydride which is to be stored in the enclosure. The use of materials that briefly react with the hydride then form a passive coating is permitted as it is a standard passivation technique for enclosures. For certain applications it may be desirable to have a non-reusable solid diluent. Such diluents utilize a phase change such as melting or vaporization or chemical reactions to absorb more heat for a given amount of diluent than is possible when the heat is absorbed only in raising the temperature of the diluent. Such applications would need provision to provide a warning that an incipient event had occurred.

Other objects and advantages will become apparent from the following descriptions, taken in connection with the accompanying drawings, wherein, by way of illustration and example, an embodiment of the present invention is disclosed.

BRIEF DESCRIPTION OF THE SEVERAL DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1A:
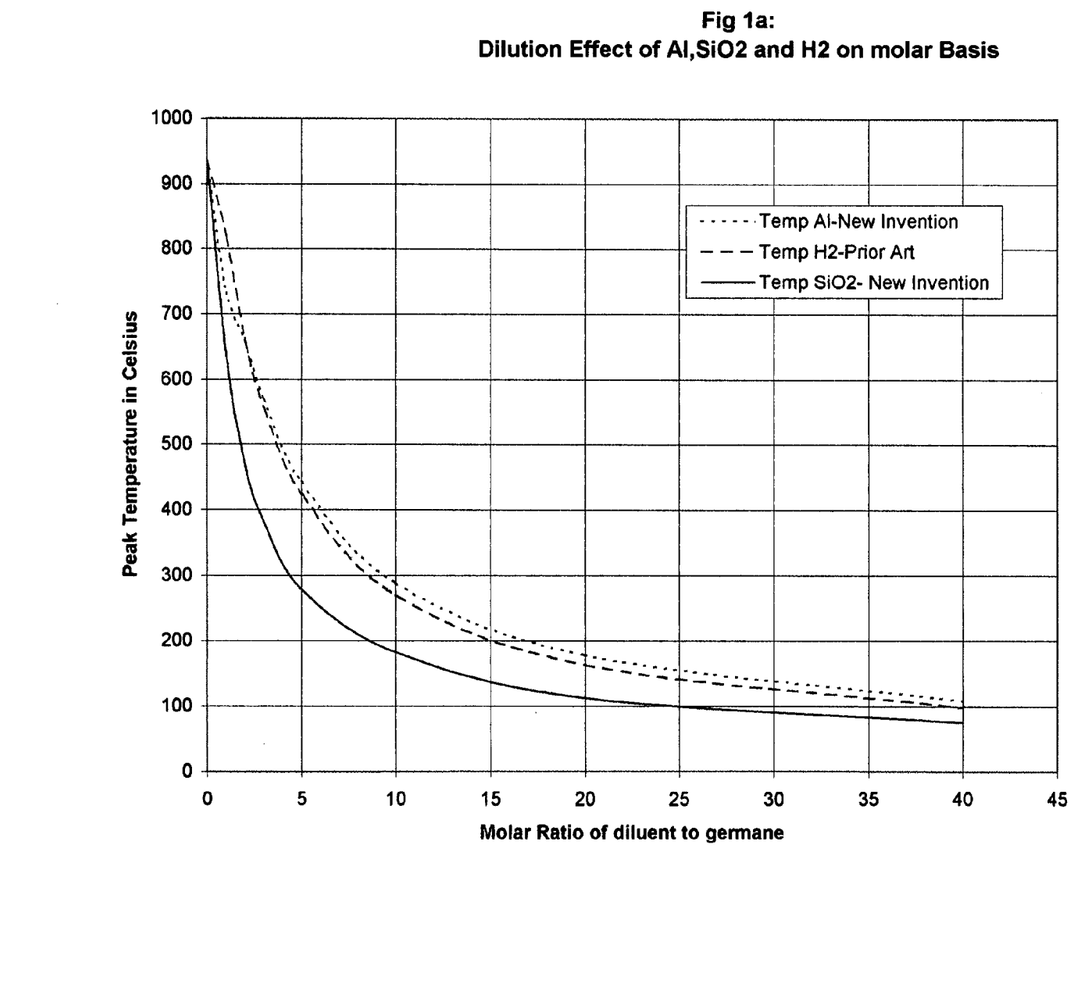
FIG. 1a is a graph illustrating that the peak temperature obtained when a quantity of germane explodes or burns can be reduced by addition of a diluent and that on a molar basis the effect is similar for the prior art gaseous hydrogen diluent and solid aluminum diluent and more effective for silica, $SiO_2$
Figure 1B:
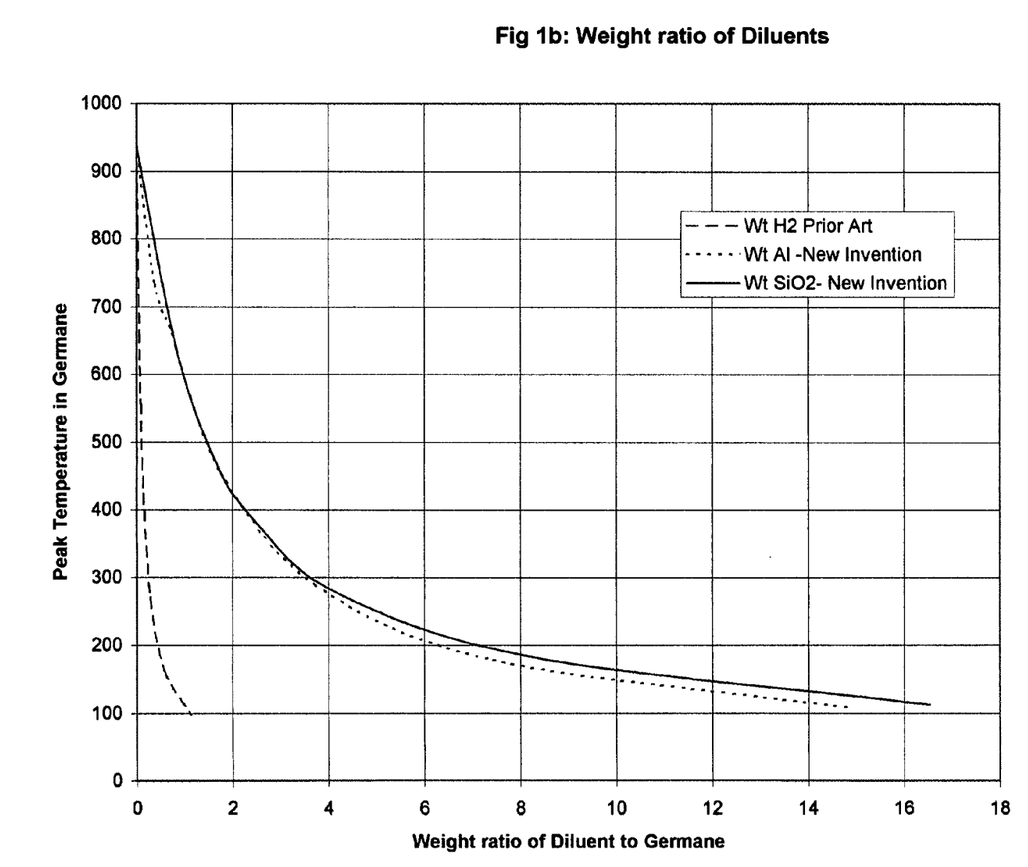
FIG. 1b is a graph illustrating that a far greater weight of aluminum and silica is required, for the same temperature reduction effect, compared to hydrogen.
Figure 1C:
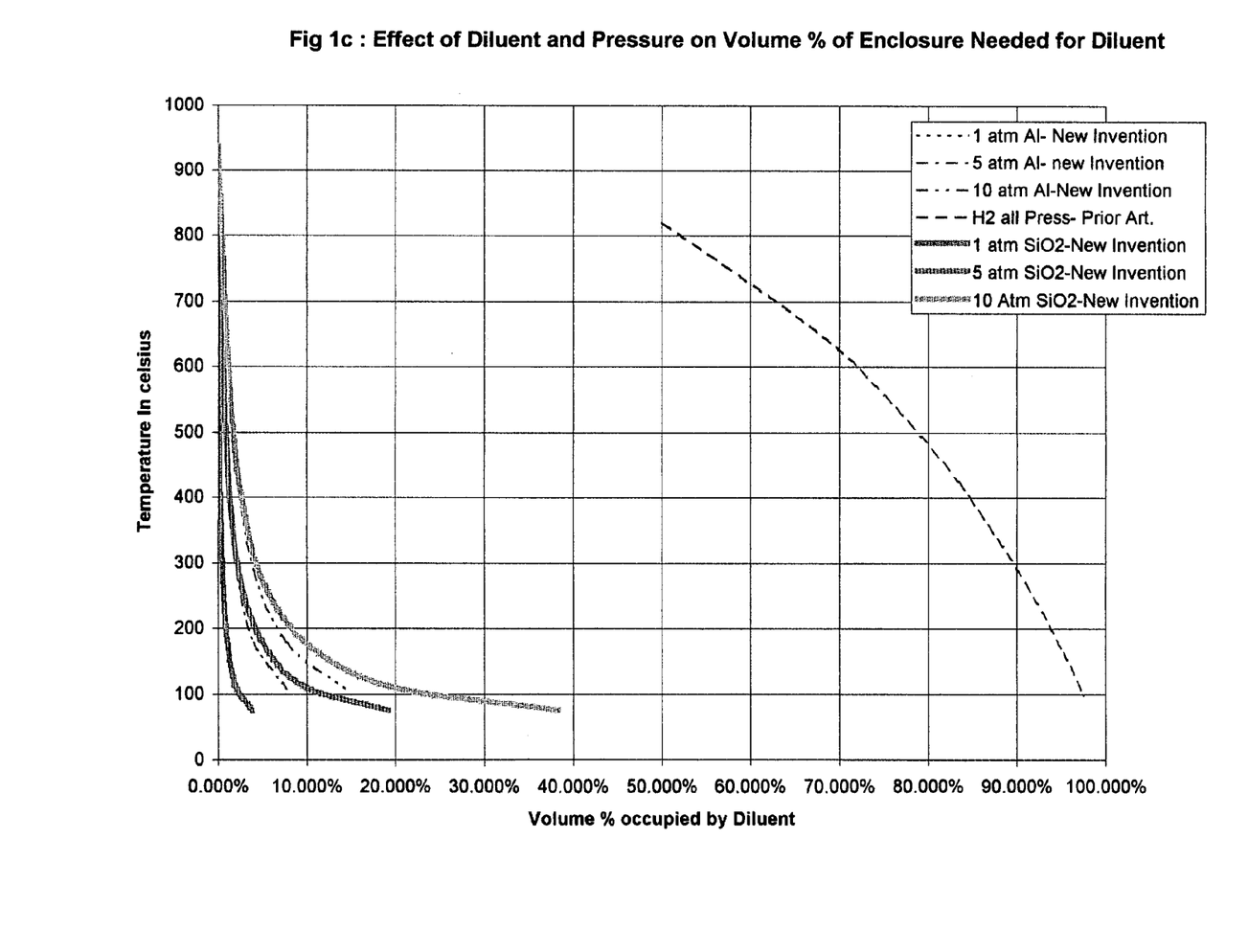
FIG. 1c is a graph illustrating that the volume percent of the enclosure, for the same temperature effect, occupied by the diluent is much less for the solid aluminum and silica diluents than for the gaseous hydrogen and that a higher pressure enclosure requires a proportionately greater solid volume.

Turning first to FIG. 1a there is shown the prior art of dilution of germane with gaseous hydrogen to reduce the peak temperature and the comparison of it to the present invention of the use of solid aluminum or silicon dioxide, silica, as the diluent. It can be seen that the effect on a molar basis is essentially the same for hydrogen and aluminum with silica being considerably better. Silica is the prime ingredient in sand and in glass thus this applies to a wide range of diluents. FIG. 1b shows the same reduction in peak temperature for hydrogen, silica and aluminum diluents compared on a weight basis rather than a molar basis. The weight of aluminum or silica required for a given reduction in peak temperature is much higher than for hydrogen because of the low molecular weight of hydrogen. FIG. 1c shows the same reduction in peak temperature for hydrogen and aluminum diluents compared on a volume basis rather than a molar basis. The volume of aluminum or silica required for a given reduction in peak temperature is much lower than for hydrogen as the molal volume of a solid is much lower than the molal volume of a gas. This graph also shows that there is no effect of pressure on the required hydrogen volume but the required aluminum or silica volume is directly proportional to the pressure.

Figure 1D:
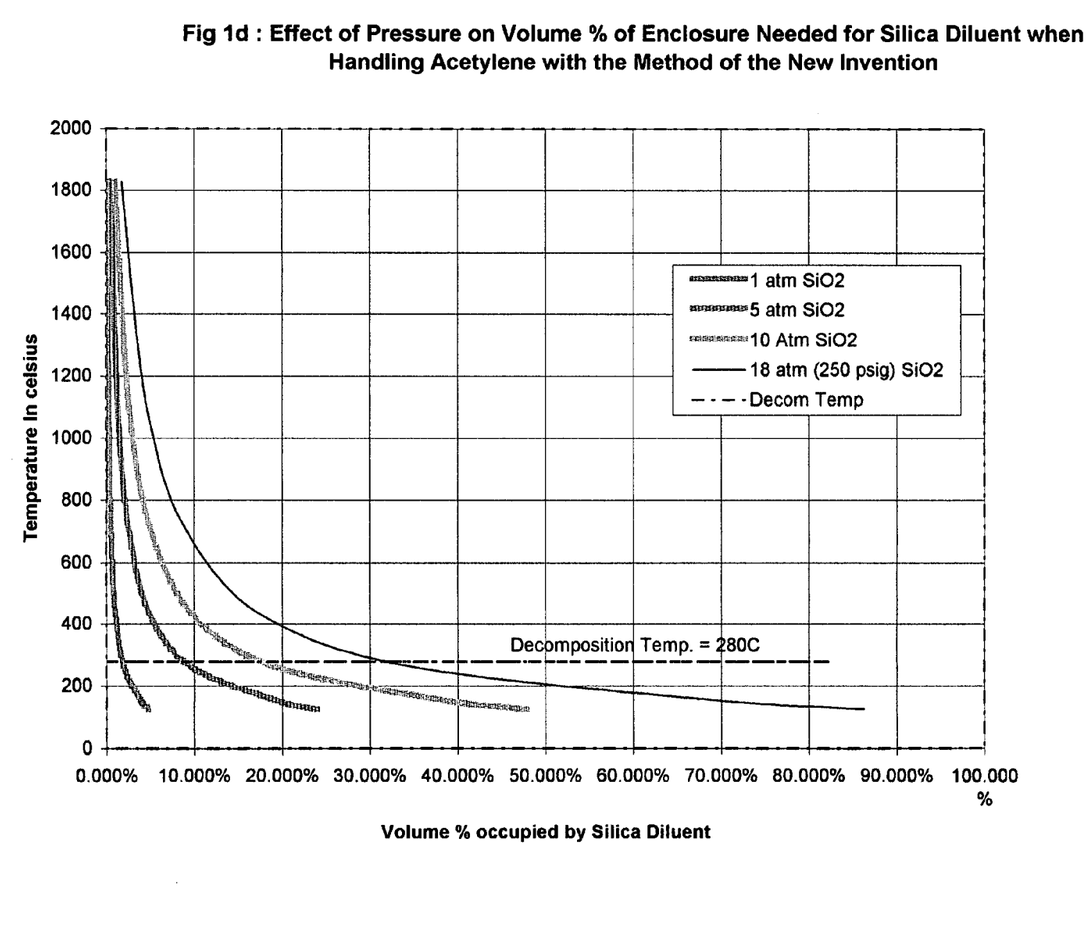
FIG. 1d is a graph showing the effect of the greater molar energy release of acetylene in providing a higher temperature and requiring greater amounts of diluent as the pressure increases.

This is a result of the fact that the molal volume of germane and hydrogen are both dependent on pressure whereas the molal volume of a solid like aluminum or silica is independent of pressure. Hence as the number of moles of germane increase in a given volume because of the increase in pressure the germane to hydrogen molal ratio remains the same but the molar germane to aluminum ratio decreases for a fixed volume of aluminum. However it can be seen that the volume of aluminum or silica required is much less than that of hydrogen even at 10 atmospheres pressure. Thus it is feasible to provide the equivalent heat storage capacity at a much lower volume with aluminum or silica than with hydrogen. Because of the inherent difference in density between gases and solids this will be true for most comparisons of gas and solid diluent. FIG. 1d shows the effect of using the much more energetic acetylene. The temperatures obtained are higher and more diluent must be used to bring the peak temperature down below the decomposition temperature. It is still feasible to use 250-psig gases with about 33% diluent. From FIG. 61 of Zabetakis it can be seen that the "tube diameter" needs to be less than 0.02 inches to prevent propagation at this pressure. This is 0.5 mm or 500 microns. Thus a suitable low cost diluent could be sand. The void fraction of sand is typically about 0.35, which means a diluent factor of 0.65 or 65%. The average particle size would be 1000–1500 microns. Such a design would have a safety factor of about 2. The fixed volume of the solid diluent has no effect on the volumetric change caused by the pure reaction in comparison to dilution with hydrogen as shown in Table 2

EXAMPLE 1

Disilane at 40% Molar with Aluminum

Peak Temperature is 485° C.

Assuming the cylinder is at 0.4 atmospheres initially then the final pressure is 0.4×7.63 atm=3 atm compared to a final pressure of 4.5 atm for the hydrogen dilution cylinder at 1 atm initially.

TABLE 3

| Name | Formula | Mol % | gas moles ratio (out/in) | Temp. C. | Pressure ratio |
|---|---|---|---|---|---|
| Disilane | Si$_2$H$_6$ | 40 | 3 | 485 | 7.63 |
| Germane | GeH$_4$ | 20 | 2 | 497.2 | 5.16 |
| Digermane | Ge$_2$H$_6$ | 10 | 3 | 452 | 7.3 |
| Stannane | SnH$_4$ | 10 | 2 | 492.8 | 5.13 |
| Arsine | AsH$_3$ | 30 | 1.5 | 483.7 | 3.8 |

Thus the additional heat required to heat the solid diluent reduces the peak temperature in a manner similar to dilution with hydrogen and requires much less volume but does not reduce the pressure ratio as much. However as noted above the volume saved can be used to reduce the initial pressure and thus achieve a lower final pressure than would be the case with hydrogen dilution. As a practical matter it will usually be safer and less costly to add more diluent and maintain or even increase the initial fill pressure. From FIG. 1c it can be seen that a much lower temperature of 200° C. is easily obtained at the cost of less than 10% of the volume being occupied by diluent even at a 10 atm. initial fill pressure and the final pressure would be 31 atm in the very unlikely event of all the germane reacting.

In order to utilize this heat capacity to prevent a fire or an explosion it is necessary to prevent the incipient reaction from heating up neighboring material to the temperature at which it will react and generate heat. This temperature is termed the decomposition temperature for the gas and is determined experimentally as it is specific to the gas. For example Tamaru determines that germane starts to decompose at 278° C. This is the temperature at which the rate of reaction, which is determined by the activation energy of the reaction, becomes perceptible. For silane the initial decomposition begins at 340° C. Thus the prior art assumption that matching the conditions for silane will make handling the hydride as safe as it is for silane is not really valid. This is particularly the case if the hydride to be matched to silane preferably decomposes heterogeneously in contrast to the homogeneous decomposition of silane. For hydrides there may be a homogeneous reaction, which occurs in the vapor phase, and a heterogeneous reaction, which occurs on the surface. A gaseous diluent is inherently effective at absorbing heat from a homogeneous reaction since it is evenly spread throughout the volume by virtue of diffusion and it adsorbs heat because of its heat capacity but does not contribute heat because it does not react. The solid diluent is inherently effective at absorbing heat from a heterogeneous reaction since the reaction occurs on the surface of the solid diluent and it adsorbs heat because of its heat capacity but does not contribute heat because it does not react. For many unstable hydrides, as shown by Devyatykh in Table 4, the heterogeneous reaction has the lower activation energy and is thus more likely to occur. Thus for a gaseous diluent such as hydrogen the hot spot occurs on the surface but the hydrogen is mixed in with the hydride gas and must move to the surface to cool it. This movement will also bring fresh reactant to the hot spot. In contrast if the heat of the initial reaction is removed directly by the solid diluent it is feasible to prevent the creation of a hot spot which could bring fresh supplies of reactant to the incipient reaction by virtue of natural convection. Thus the total volume of the enclosure must be subdivided into smaller volumes so that the heat from the incipient reaction in one volume cannot spread to neighboring volumes, but is instead absorbed in heating the solid diluent, and to slow the flow of reactant to the incipient reaction site.

Figure 2:
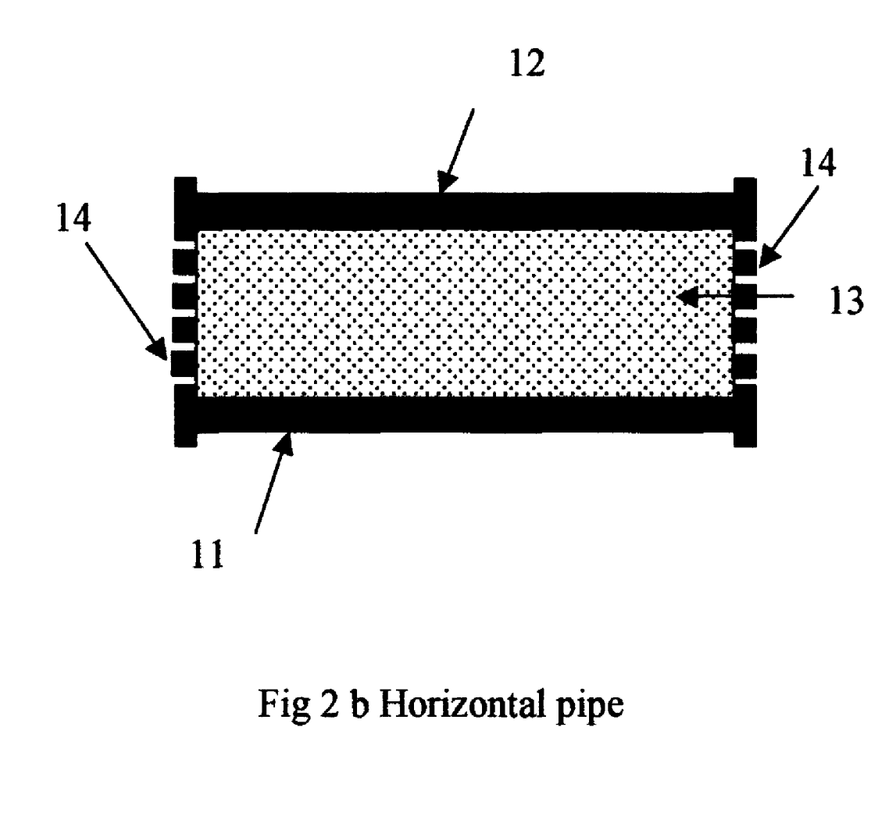
FIG. 2a is a schematic representation of the invention as applied to a gas cylinder.
FIG. 2b is a schematic representation of the invention as applied to a horizontal pipe.

In order to accomplish this important function of the invention, there is shown in FIG. 2a a gas cylinder with two different means of providing the subdivided volumes within the gas cylinder. The gas cylinder consists of a main body 1, which stores the bulk of the gas and a smaller diameter neck 2, where the cylinder valve is attached. The body of the cylinder is filled with packing 3, which can be poured in through the smaller diameter neck. The neck itself is filled with a woven aluminum pad of the same diameter as the inside of the neck. The poured packing is poured in slowly and vibrated to prevent formation of voids and to avoid headspace at the top of the main body.

Figure 3:
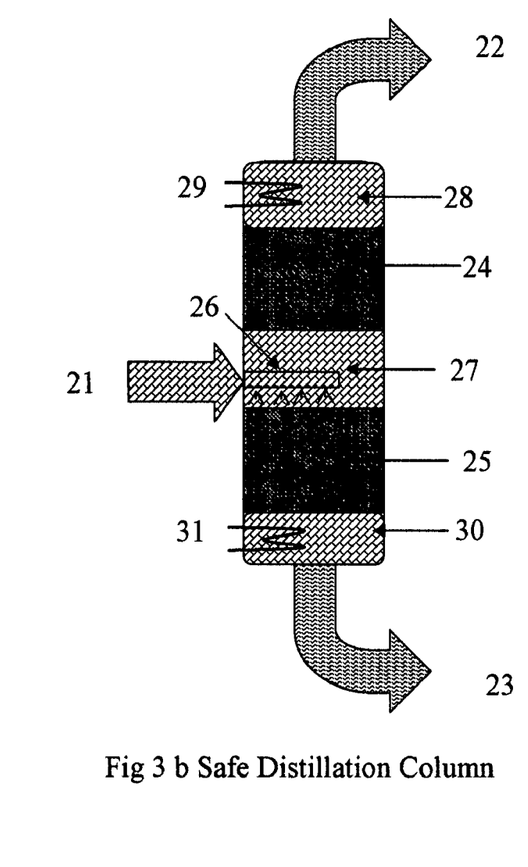
FIG. 3a is a schematic representation of the prior art packed distillation column showing open areas where explosions of fires can occur.
FIG. 3b is a schematic representation of the invention as applied to the prior art packed distillation column showing that the open areas where explosions of fires can occur have been rendered safe by filling with a solid diluent.
Figure 3A:
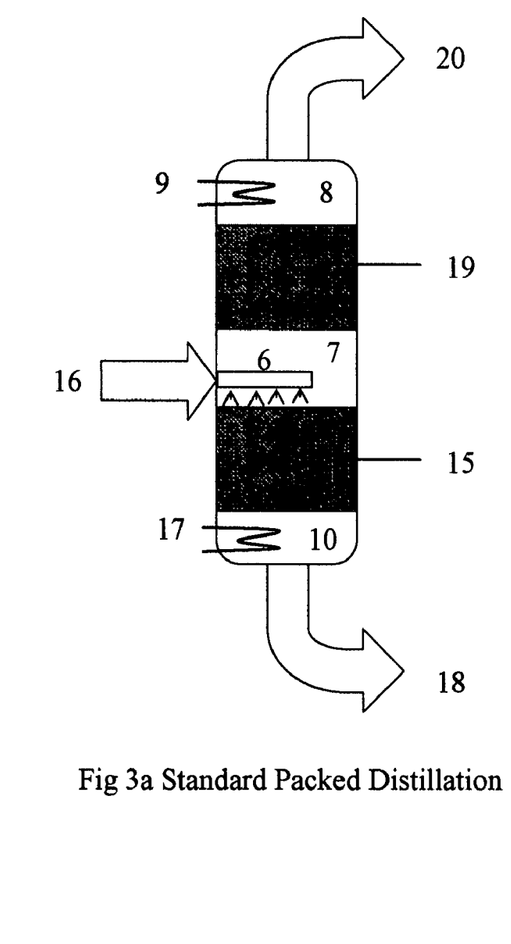

The woven pad is further compressed during the installation of the valve as it is screwed into the neck, which provides pressure on the poured packing as a way of compensating for movement of the packing that might cause voids to appear. It should be noted that the main body 1 of the cylinder does provide some solid diluent effect but it is not as effective or reliable as the packing or mesh because it does not subdivide the volume. It can be seen that if the diameter of the main body becomes smaller the effectiveness of the diluent effect of the main body will grow as the surface area capable of absorbing heat grow relative to the volume capable of generating the heat. In FIG. 2b there is shown a horizontal pipe 11, with walls 12, and a fiber filling, 13, that is the same diameter as the internal diameter of the pipe. This avoids the problem of settling of the packing material which might provide an undivided head space wherein a reaction might propagate. The fiber is retained in the pipe section with a porous or perforated retention plate, 14, at each end to prevent pressure surges from dislodging the fiber. The fiber could be glass, steel, stainless steel or aluminum wool or could be a mesh or series of perforated plates. In accordance with the present invention, FIGS. 3a &b are a schematic diagrams which shows how the various elements of a packed distillation column, FIG. 3a, typical of the prior art, would be converted to be safe to operate for the production of concentrated unstable hydrides as shown in FIG. 3b. In FIG. 3a the feed pipe 16, the overhead line 20 and the bottom line 18, are shown as bare pipes. The feed to the column enters through a distributor 6, into the empty center 7, of the column. Above the center is the packed rectifying section 19, then the empty top of the column, 8, within which is the condenser coil 9. Below the center is the packed stripping section 5, and the empty bottom of the column 10 within which is the reboiler coil 17. In the conversion to a safe system each of these empty areas, 16, 20, 18, 6, 7,8 & 10 must be subdivided and provided with a widely distributed solid diluent. The two packed sections, 4 & 5, are already subdivided and may provide adequate dilution but must be analyzed to ensure that there is adequate heat capacity in the solid diluent under the normal operating conditions to prevent a temperature rise from the operating temperature to the decomposition temperature in the event of an incipient fire or explosion. The open pipes and column sections must be filled with solid diluent to subdivide these enclosures and provide heat capacity. As is shown in FIG. 3b the inlet, 21, and outlet, pipes, 22 & 23, are filled with a mesh pad and the bottom, 30, center, 27, and top, 28, sections of the column are filled with poured packing. The column packing in the rectifier section, 24 and stripper section, 25, is left unchanged. The distributor 26 is filled with fibrous packing. It is known that there are many different ways of arranging a distillation column or other separation device but one knowledgeable in the art should be able to make any design safe by subdividing any open space with a solid diluent selected and sized to prevent an incipient reaction from raising the temperature from the system operating temperature to the decomposition temperature. The use of the system operating temperature as the base point for the design is required. Use of refrigeration will be beneficial in reducing the diluent requirements but standard process safety management techniques should be followed to ensure that unsafe conditions couldn't occur due to inadvertent warm-up of the system. Certain distillation designs may not function well when subdivided and hence these designs cannot be used. For example a trayed distillation column has spaces between each tray and filling these spaces may interfere with the tray action and is therefore not feasible.

Figure 4A:
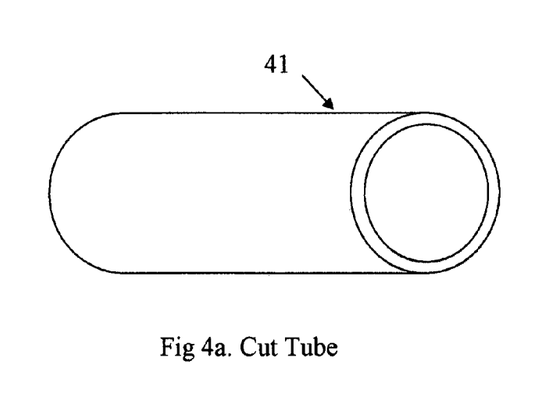
FIG. 4a is a side view of a piece of solid diluent made by cutting a hollow tube into lengths.
Figure 4B:
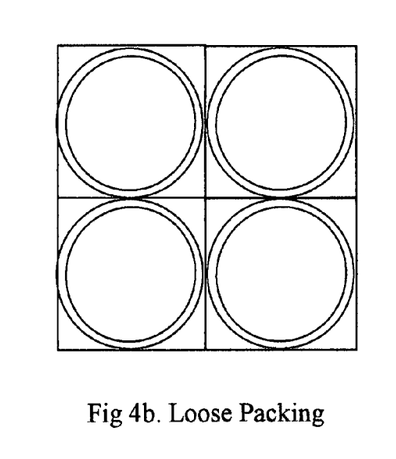
FIG. 4b is a cross sectional view of a loosely packed arrangement of hollow tubes.
Figure 4C:
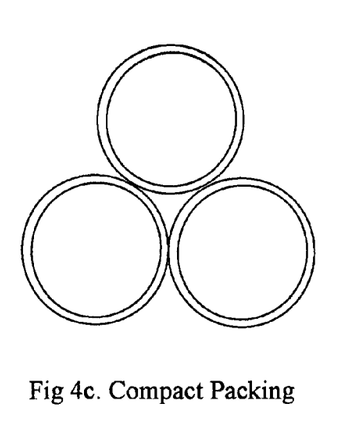
FIG. 4c is a cross sectional view of a tightly packed arrangement of hollow tubes.

To accomplish the important function of the invention of using a poured packing to subdivide the enclosure and provide the heat capacity needed for the solid diluent, there is shown in FIG. 4a,b&c simple designs to show the required characteristics and the effects of randomness in the packing process. FIG. 4a shows an aluminum tube 41, of 0.5" outside diameter and 0.028" thickness cut into 1" lengths. FIG. 4b shows that when these tubes are loosely stacked there is also an outside space, which corresponds to the area of the square circumscribed on the outside diameter minus the cross-sectional area of the tube. Thus the volume of aluminum is 0.0415 cu inches and the total volume is 0.25 cu inches, which corresponds to 16.6% aluminum. FIG. 4c shows the most compact packing possible. The actual packing achieved in random packing will be between these two extremes. Designing for the loosest packing will ensure that the loosest sub volume still meet the requirements. The tighter packed areas will have a bigger safety margin. As a practical matter it is required that a minimum weight of packing be installed to obtain the desired peak temperature rise and that there be few if any large voids or a headspace. Thus by knowing the weight of the packing and the volume of the enclosure it is possible to know if it has been well packed and by observation it can be seen if there is any headspace and additional material can be added to fill it. For further assurance it is feasible to apply a safety factor by increasing the volume of aluminum. It is also feasible to perform detailed finite element analysis calculations on the temperature distribution and heat production with time for a given packing geometry as done by Lund et al. This will enable the calculation of the heat loss from the immediate area of the incipient reaction and thus spread the heat absorption over a greater volume of diluent and gas that absorb the heat generated, which reduces the temperature rise. This is also the case for the hydrogen diluent as a greater volume of gas is heated than the core gas, which is heated to the decomposition temperature. This accounts for the success of the prior art in diluting germane to 20%, which results in a calculated peak temperature of 463° C. when Tamaru reports the minimum decomposition temperature of germane is 278° C. Such calculations are particularly appropriate for germane and other unstable hydrides because the heterogeneous reaction on the surface has a smaller activation energy than the homogeneous reactions hence most incipient reactions will occur on the surface where the heat can be removed by conduction.

Many other pourable diluent designs are also possible and it is also possible to use commercially available column packings but these are primarily designed for gas liquid contacting which is not required for solid diluent. For situations requiring very high diluent volumes it is feasible to use solid balls or granular material such as aluminum shot or sand. Use of fine materials brings the risk of blowing out the bed so some retention device may be needed. Such solid materials would have a volume of about 65% based on a typical void fraction of 35%. It is also possible to use wools such as glass, steel, stainless steel, copper or aluminum wools, which have low, bulk density and come in different grades. Use of plastics is feasible in a reusable way if the melting point of the plastic is greater than the peak temperature. Use of plastics in a disposable manner is feasible if the design includes provision for melting of the plastic as a means to absorb heat.

Thus it can be seen that it is feasible to construct safe apparatus for the production, purification, storage or transportation of unstable hydrides in many different ways by following the method of calculating the required solid diluent to prevent the peak temperature exceeding the decomposition temperature of the hydride and subdividing the enclosure volume with the aforementioned solid diluent.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method for safely handling unstable hydride gases comprising:

providing an enclosure with one or more openings;

providing a partitioning means to divide the said enclosure into smaller volumes;

providing one or more connecting passageways between each smaller volume and to an opening to the enclosure;

providing a means to store heat within the said enclosure;

providing a heat transfer means from every smaller volume to the means to store heat; and providing a means for sizing the partitions, the means to store heat and the heat transfer means so as to prevent the temperature of the gas or gases in any of the smaller spaces from reaching the minimum temperature needed to cause ignition or decomposition of the gas or gases in an adjoining space.

2. A method as claimed in claim 1 wherein said partitioning means comprises part or all of the means to store heat.

3. A method as claimed in claim 1 wherein said partitioning means comprises part or all of the heat transfer means.

4. A method as claimed in claim 1 wherein said partitioning means can be inserted through an opening that has a smaller diameter than the enclosure.

5. A method as claimed in claim 1 wherein providing said means to store heat can comprise raising the temperature of a heat storage medium, melting or vaporizing a heat storage medium, initiating a heat absorbing chemical reaction of a heat storage material or any combination thereof.

6. A method as claimed in claim 1 wherein said minimum temperature is the thermal decomposition temperature of hydride gases which can release heat by decomposing without oxidation which include acetylene, propadiene, methylacetylene, butadiene, ethylene, hydrazine, silane, disilane, trisilane, germane, digermane, trigermane, arsine, stibine, bismuthine, plumbane, hydrogen selenide and hydrogen telluride.

7. A method as claimed in claim 1 wherein said partitioning means comprises commercially available column packing, cut tubing pieces, metal turnings, hollow or solid balls, mesh, fabric, granular material, open cell foams or sintered metal.

8. A method as claimed in claim 1 where the temperature required to prevent ignition is between 25° C. and 600° C.

9. A method as claimed in claim 1 where the size of the sub volume created by the partitioning means is between $1\times10^{-18}$ and $1\times10^{-3}$ cubic meters.

10. A method for suppressing explosions as claimed in claim 1 wherein said partitioning means is coated with a further material.

11. A method as claimed in claim 1 wherein said partitioning means is coated with a material which decomposes at a temperature between room temperature and the said minimum temperature and provides a chemical which can be detected to indicate that the temperature of the enclosure has been elevated.

12. A method as claimed in claim 1 where a some or all of the partitioning means consists of one or materials which absorb heat when they react.

* * * * *